(12) United States Patent
Ennis et al.

(10) Patent No.: US 11,156,223 B2
(45) Date of Patent: Oct. 26, 2021

(54) BLOWER SYSTEM FOR BLOWING FLUID OFF OF A PASSING VEHICLE

(71) Applicant: N/S CORPORATION, Inglewood, CA (US)

(72) Inventors: G. Thomas Ennis, Inglewood, CA (US); Alex Chavez, Hesperia, CA (US)

(73) Assignee: N/S CORPORATION, Inglewood, CA (US)

( * ) Notice: Subject to any disclaimer, the term of this patent is extended or adjusted under 35 U.S.C. 154(b) by 0 days.

(21) Appl. No.: 16/151,134

(22) Filed: Oct. 3, 2018

(65) Prior Publication Data

US 2019/0136860 A1     May 9, 2019

Related U.S. Application Data

(60) Provisional application No. 62/567,353, filed on Oct. 3, 2017.

(51) Int. Cl.
| | | |
|---|---|---|
| *F04D 15/00* | (2006.01) | |
| *B60S 3/00* | (2006.01) | |
| *F04D 27/00* | (2006.01) | |
| *F04D 25/16* | (2006.01) | |
| *F26B 21/12* | (2006.01) | |

(52) U.S. Cl.
CPC .......... *F04D 15/0005* (2013.01); *B60S 3/002* (2013.01); *F04D 25/166* (2013.01); *F04D 27/003* (2013.01); *F04D 27/005* (2013.01); *F26B 21/12* (2013.01); *F26B 2210/12* (2013.01)

(58) Field of Classification Search
CPC ...... F26B 2210/12; F26B 21/06; F26B 21/12; F04D 15/0005; F04D 25/166; F04D 27/003; F04D 27/005; B60S 3/002; F24F 13/10; F24F 13/16
USPC ..................................................... 34/666, 270
See application file for complete search history.

(56) References Cited

U.S. PATENT DOCUMENTS

| | | | | |
|---|---|---|---|---|
| 3,996,750 | A * | 12/1976 | Brear ........................ | F16K 3/02 405/104 |
| 7,565,753 | B2 * | 7/2009 | Christopher ............ | B60S 3/002 34/270 |
| 2004/0250372 | A1* | 12/2004 | McElroy ................. | B60S 3/002 15/316.1 |

FOREIGN PATENT DOCUMENTS

JP          2005036998 A  *  2/2005  ............ F24F 1/0007

* cited by examiner

*Primary Examiner* — Jessica Yuen
(74) *Attorney, Agent, or Firm* — Risso IP

(57) ABSTRACT

Described is a blower system. The blower system includes one or more blowers. Each blower has an intake for providing air into an air chamber which houses an impeller. A gate covers each intake. Each gate is movable between a closed position in which it is pulled against the intake and an open position in which the gate is lifted off of the intake. A controller system is included that is operable for causing the gates to move from the closed to the open position when a vehicle is present or approaching and cause the gates to return to the closed position when no vehicle is present or leaving.

1 Claim, 5 Drawing Sheets

BLOWER SYSTEM FOR BLOWING FLUID OFF OF A PASSING VEHICLE

CROSS-REFERENCE TO RELATED APPLICATIONS

This is a non-provisional application of U.S. Provisional Application No. 62/567,353, filed on Oct. 3, 2017.

BACKGROUND OF THE INVENTION

(1) Field of Invention

The present invention relates to a blower system and, more specifically, a blower system for blowing fluid off of a passing vehicle.

(2) Description of Related Art

Vehicle washing systems typically have a soap applicator, a scrubbing station, a rinsing station and, desirably, a drying station. During operation, the vehicle passes through a traditional vehicle washing system and is washed, rinsed, and dried. The drying station is often a series of blowers that blow water off of the passing vehicle. Sensors or other systems are typically used to identify when vehicle is approaching the blowing station to cause the blowers to start up and begin blowing air. A problem with such traditional blower stations is that the frequent starts dramatically reduce the blower's motor life. Further, while starting, there are power spikes that are tough on equipment and add to electrical costs. Lastly, the noise output is often uncomfortably loud for nearby people and therefore contributes to noise pollution.

Thus, a continuing need exists for a blower system that increases motor life by minimizing the unnecessary and onerous starts and stops, while reducing power usage, and reduces noise output to a more comfortable level.

SUMMARY OF INVENTION

This disclosure is directed to a blower system for blowing fluid off of a passing vehicle. In various embodiments, the blower system includes one or more blowers, each blower having an intake for providing air into an impeller chamber which houses an impeller. An actuatable gate covering each intake and is movable between a closed position in which it is pulled against the intake and an open position in which the gate is lifted off of the intake. Further, an actuator is connected with each gate. The actuator is operable for moving the gate between the closed and open positions.

In another aspect, controller system is included. The controller system operable for sending a signal to the actuator to cause the actuator to move the gate between the closed and open positions. The controller system includes one or more sensors for determining when a vehicle is approaching the one or more blowers and is further operable for causing the actuator to lift the gate from the intake when the vehicle is proximate the one or more blowers and pull the gate back over the intake after the vehicle has passed by the one or more blowers.

Finally, as can be appreciated by one in the art, the present invention also comprises a method for forming and using the system described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a blower system and, more specifically, a blower system for blowing fluid off of a passing vehicle. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1:
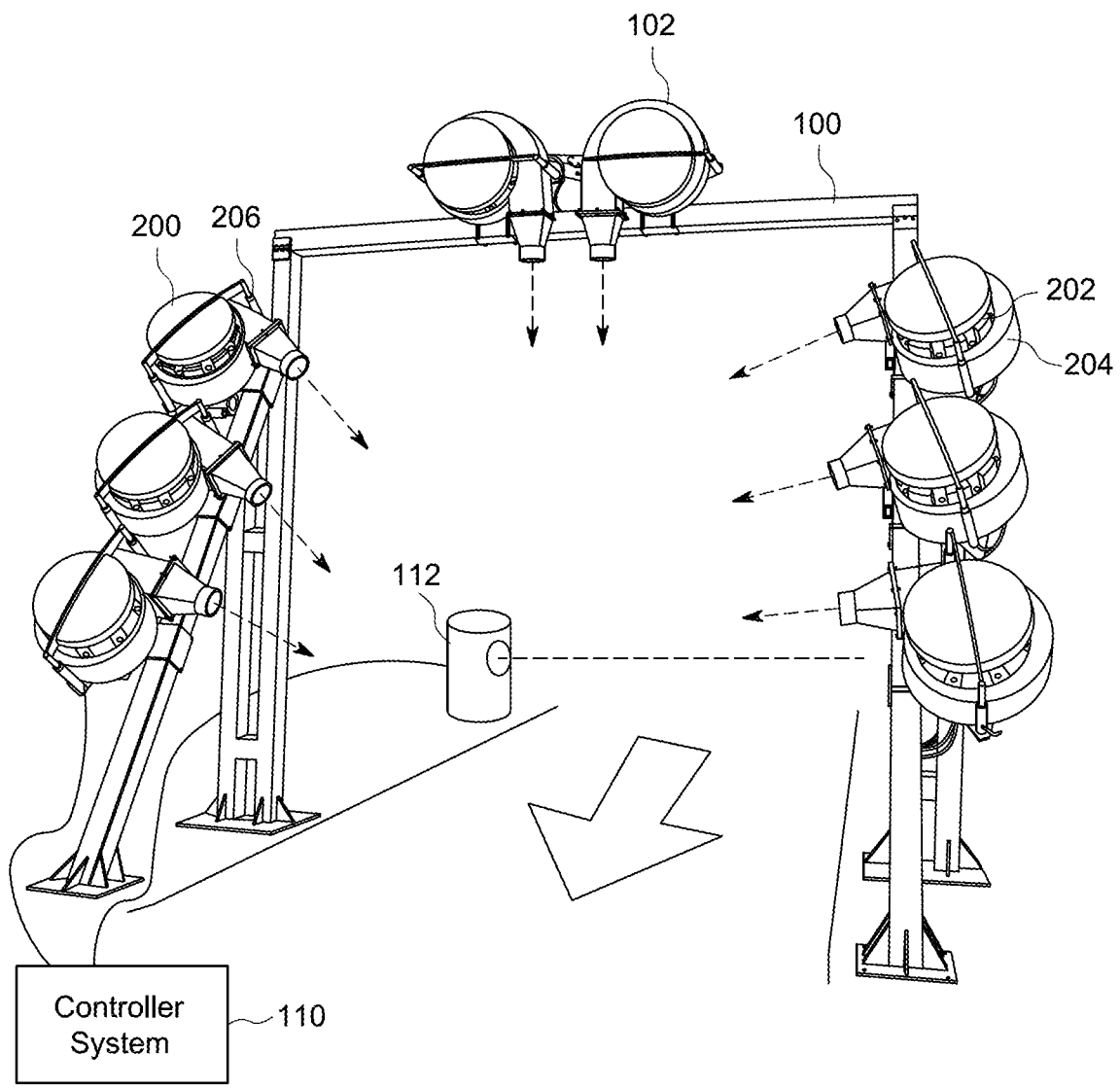
FIG. 1 is an illustration of the blower system according to various embodiments of the present invention, depicting a plurality of blowers as attached with frame system.

The present invention relates to a blower system and, more specifically, a blower system for blowing fluid off of a passing vehicle. The present invention includes all of the necessary hardware, sensors, software, and/or processors as may be needed to perform the feature as described and illustrated in this disclosure. As shown in FIG. 1, the blower system includes a frame system 100 having at least one and, desirably, a plurality of blowers 102 that are positioned about the frame system 100 to blow air onto a passing vehicle. Although the frame system can be used, it should be understood that the invention is not intended to be limited thereto as the blowers 102 can be hung or otherwise attached to a building or other component to position the blowers at the desired location such that they are operable for blowing air onto a passing vehicle.

Figure 2:
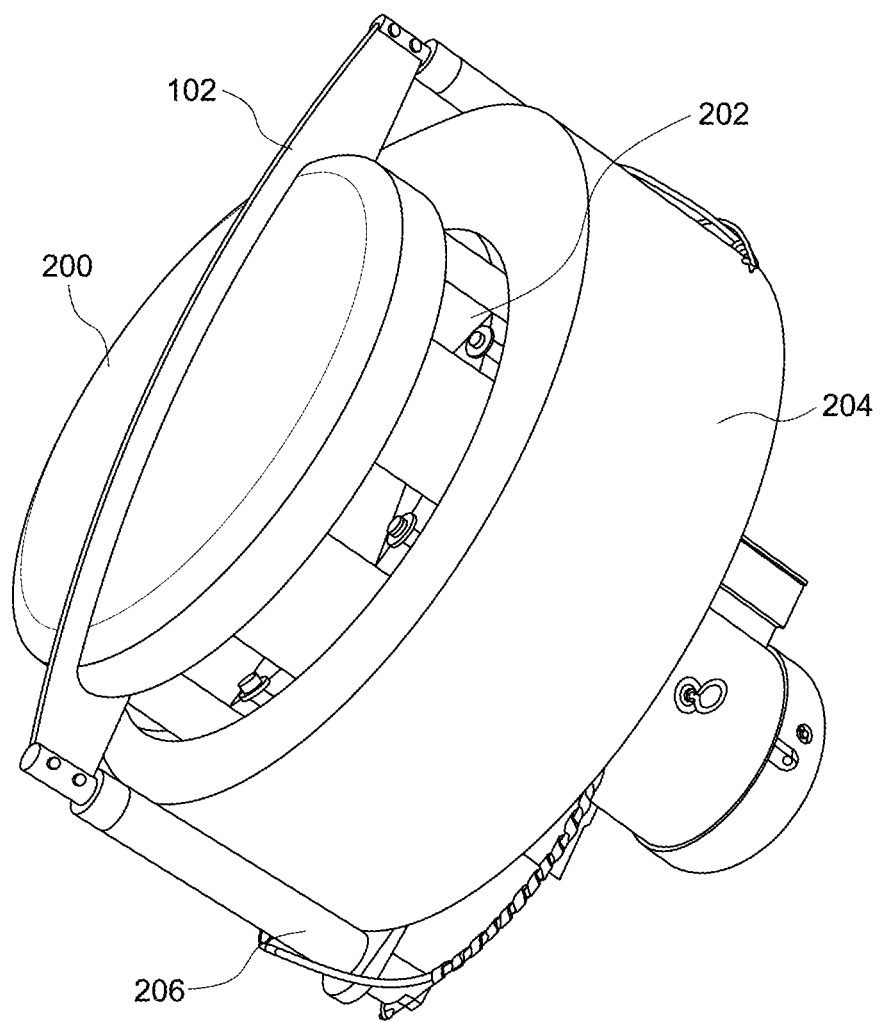
FIG. 2 is an illustration of an individual blower in a blower system according to various embodiments of the present invention, depicting a gate as pulled against an intake to the blower to cover the intake in a closed configuration.

Notably, as shown in FIG. 2, the blowers 102 include an actuatable gate 200 that is positioned over the intake 202 to the impeller chamber 204 of the blower. The gate 200 is an openable/closeable gate that is operated using any suitable mechanism or device, such as being pneumatically operated, solenoid operated, etc. The gate 200 is operable for selectively opening and closing the inflow of air into the impeller chamber 204, reducing the power required to operate the blower 102. When no vehicle is in service, an actuator 206 (e.g., pneumatically operated solenoid or cylinder, etc.) pulls the gate 200 over the intake 202 to the impeller chamber 204 to seal the intake 202 and close the gate 200 while allowing the motor to continue running.

Figure 3:
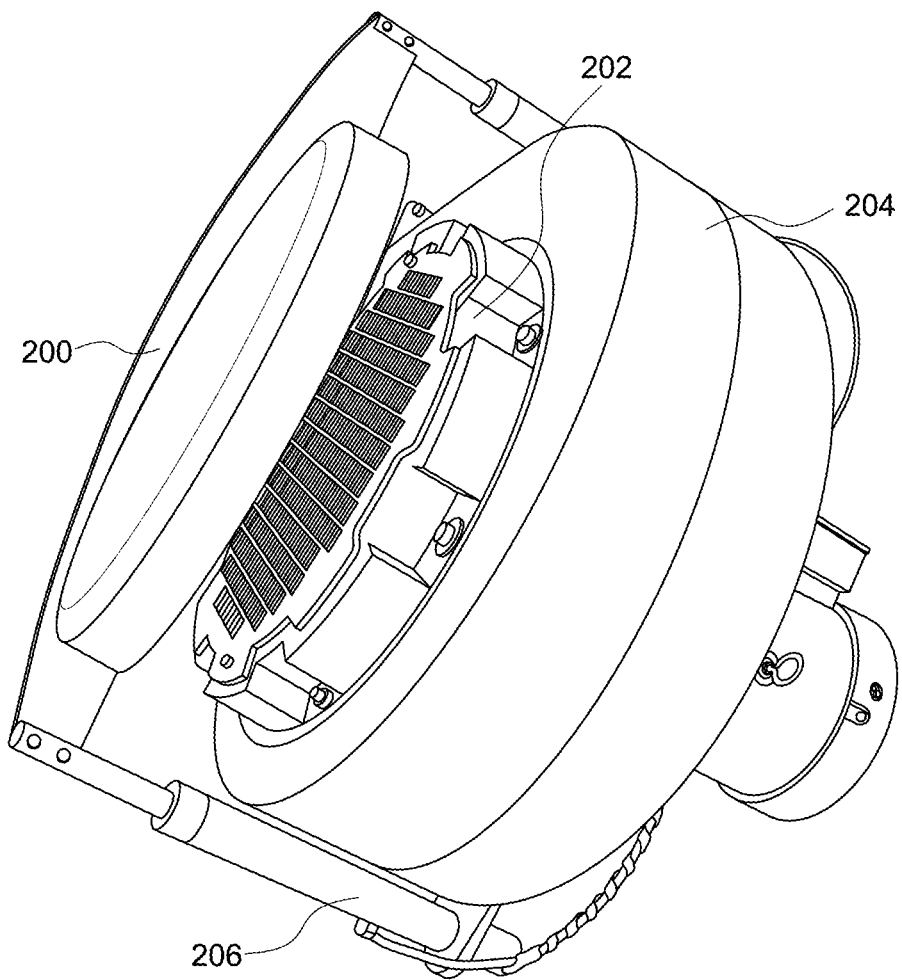
FIG. 3 is an illustration of an individual blower in a blower system according to various embodiments of the present invention, depicting the gate as lifted off of the intake to the blower in an open configuration.
Figure 4:
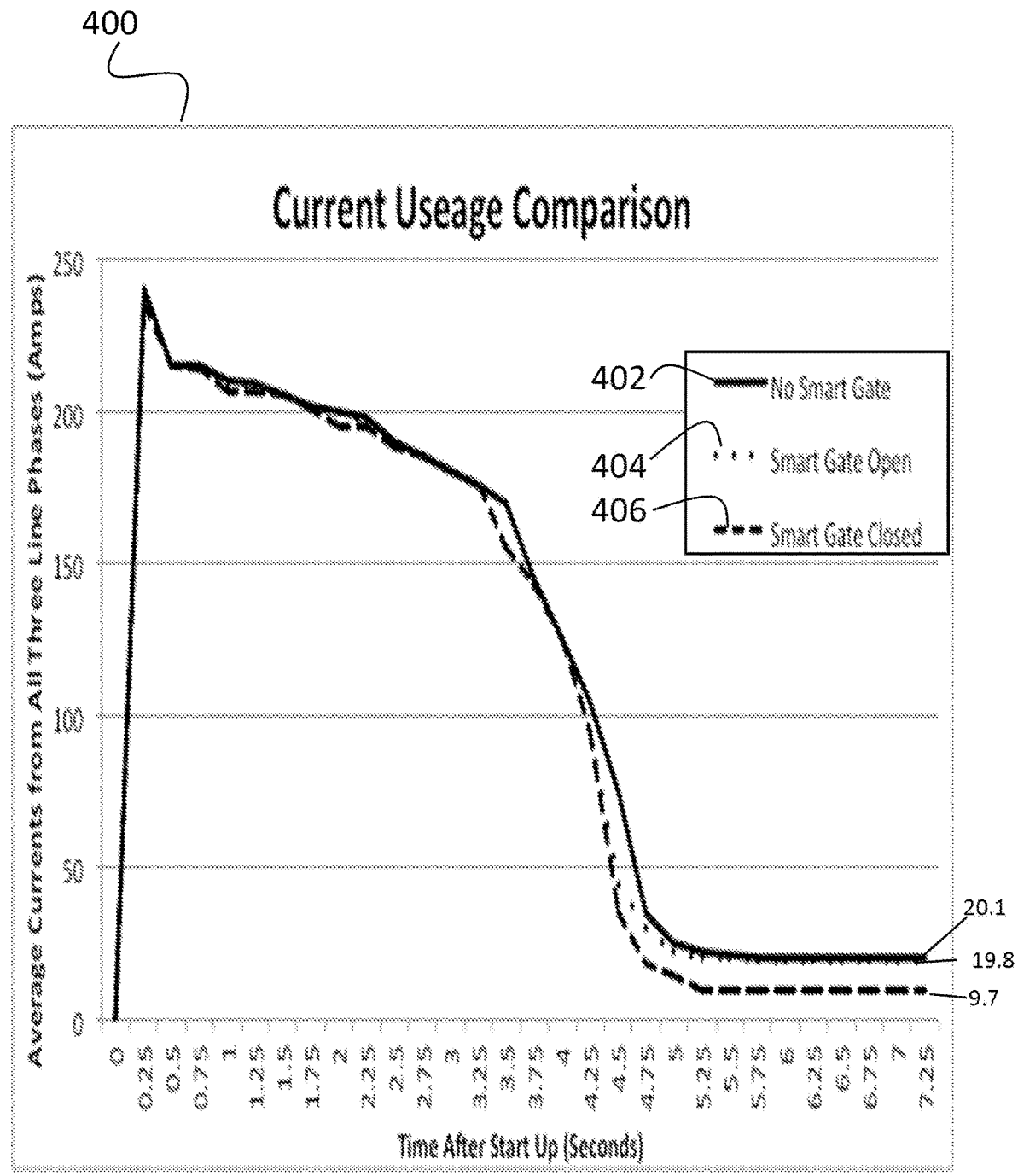
FIG. 4 is a chart depicting electrical current used with no blower, with a blower with the gate closed, and with a blower with the gate open, indicating that the blower assists in reducing power usage.

Alternatively and as shown in FIG. 3, the actuators 206 can be actuated to lift the gate 200 off of the intake 202 to the impeller, chamber 204 to allow air to freely flow into the impeller chamber 204 and blower in an open position. It should be noted that the blower described herein is any suitable blower device that is operable for blowing water or fluid off of a passing vehicle, with the actuators 206, gate 200 and intake 202 being formed and/or otherwise operable to allow for selective operation of the gate 200. The gate 200 is attachable to most blowers commonly used in the industry and can be easily installed to retrofit most blowers. As stated above, the blower system described herein reduces power consumption on idle by half, as seen in FIG. 4, and works with any suitable compressor components, such as a small compressor (e.g., eight gates requires 0.256 CFM). The blower system is also made of a sufficient durable material (e.g. structural aluminum) that is able to withstand the necessary loads and strains of the system.

Due to the decreased air inflow, the motor load is dramatically increased when the gates are closed, by as much as 50%. This would allow the operator to leave the blowers on for longer periods in between vehicle washes, thereby eliminating the high current draw needed to restart blowers in between starts. FIG. 4, for example, provides a chart 400 illustrating the current usage comparison between a blower with no gate 402, a blower with an open gate 404, and a blower with a closed gate 406. As shown, the current needed to start up a blower with a closed gate 406 is much less (i.e., 9.7 amps) than a blower with no gate 402 (i.e., 20.1 amps) or a blower with an already opened gate 404 (i.e., 19.8 amps).

Alternatively, when a vehicle is present or approaching the blower station, the system (software, processors, etc.) causes the actuator 206 to lift the gates 200 off of the intake 202 to the impeller chamber 204, thereby allowing the blowers 102 to provide a full blow load. Thus, the system also includes a controller system having all of the necessary software, sensors, hardware, etc. to cause the gates to move from the closed to the open position when a vehicle is present (actually present or approaching, as desired and/or predetermined) and cause the gates to return to the closed position when no vehicle is present (actually not present or leaving, as desired and/or predetermined). As a non-limiting example and as shown in FIG. 1, the controller system 110 includes sensors 112 (e.g., infrared sensors, etc.) positioned proximate the entrance to the blower system (e.g., 3 feet (or any desired predetermined distance)). When a vehicle passes by the sensors 112, the controller system 110 determines that a vehicle is approaching the blower station and, as such sends a signal to the actuators to cause the actuator 206 to lift the gates 200 off of the intake 202 to the impeller chamber 204, thereby allowing the blowers 102 to provide a full blow load. Similarly, the control system can cause the actuators 206 to pull the gate 200 back over the intake 202 to place the blowers 102 in the closed configuration. For example, sensors can be place proximate the exit of the blower station (e.g., 10 feet past the blower station (or any other desired predetermined distance)) such that the control system is operable for determining when the vehicle has left the blower station. As another example, the control system can simply use a timed out operation, such as opening the gate 200 for a predetermined amount of time (e.g., 10 seconds, 15 seconds, etc.) after sensing the approaching vehicle, after which the control system causes the actuators 206 to pull the gate 200 back over the intake 202 to place the blowers 102 in the closed configuration. Thus, as can be appreciated by those skilled in the art, there are several techniques by which the gates 200 can be opened and closed to effectively open only when a vehicle is passing by the blower station.

Figure 5:
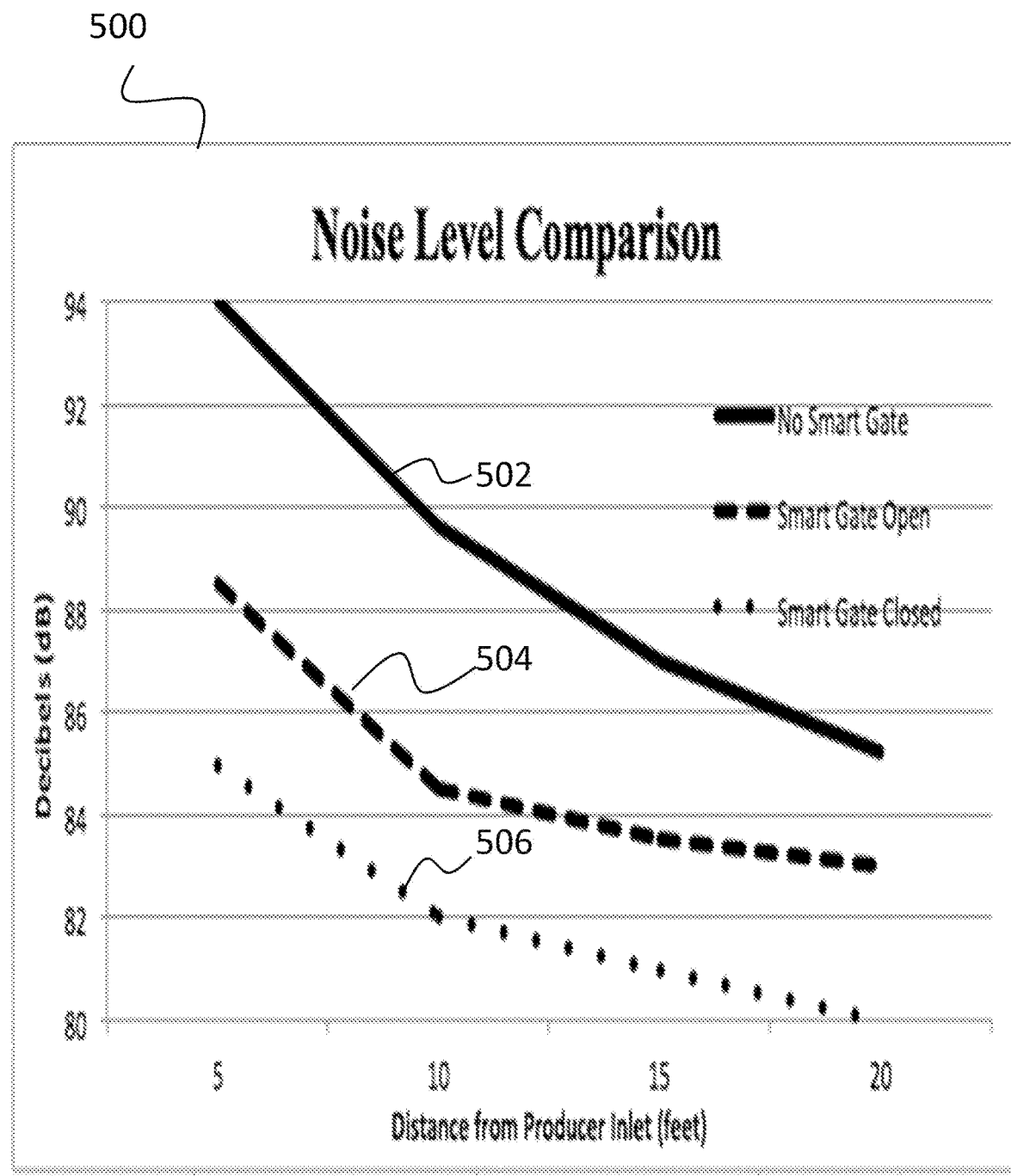
FIG. 5 is a chart depicting the differences in noise level output between using no blower, using the blower with the gate closed, and using the blower with the gate open, indicating that the blower assists in reducing noise output.

Lastly, when the gate 200 is in a closed position, it greatly reduces the noise output (in decibels) as compared to a generic system with no smart gate. It also reduces the noise output when in the open position, from 94 decibels to 88 decibels. These comparisons can be seen in more detail in FIG. 5. Specifically, FIG. 5 is a chart 500 illustrating noise level comparisons between a blower with no gate 502, a blower with an open gate 504, and a blower with a closed gate 506. As shown, the noise emitted by a blower with a closed gate 506 is much less than a blower with no gate 502 or a blower with an already opened gate 504, thereby dramatically reducing noise pollution.

What is claimed is:

1. A blower system, comprising:
one or more blowers, each blower having an intake for providing air into an impeller chamber which houses an impeller, wherein an intake plane passes through the intake;
an actuatable gate covering each intake, the actuatable gate being movable between a closed position in which it is pulled against the intake and an open position in which the gate is lifted off of the intake, wherein a gate plane passes through the actuatable gate;
a pair of actuators connected with the actuatable gate, the pair of actuators attached and being operable for moving the gate between the closed and open positions while lifting the gate away from the intake in a direction substantially orthogonal to the intake plane while the gate plane remains substantially parallel to the intake plane;

a controller system, the controller system operable for causing the gate to move between the closed and open positions; and wherein the controller system includes one or more sensors for determining when a vehicle is approaching the one or more blowers and is further operable for causing the actuators to lift the gate from the intake when the vehicle is proximate the one or more blowers for a predetermined amount of time after sensing the approaching vehicle, after which the controller system causes the actuators to pull the gate back over the intake to place the blowers in the closed configuration.

\* \* \* \* \*